(12) United States Patent
Costantini et al.

(10) Patent No.: US 12,016,343 B2
(45) Date of Patent: Jun. 25, 2024

(54) LOADING AND UNLOADING APPARATUS FOR LOADING AND UNLOADING BACON SLICES

(71) Applicant: VE.MA.C. SOCIETA' A RESPONSABILITA' LIMITATA, Modena (IT)

(72) Inventors: Maurizio Costantini, Spilamberto (IT); Franco Vezzali, Spilamberto (IT)

(73) Assignee: VE.MA.C. SOCIETA' A RESPONSABILITA' LIMITATA, Modena (IT)

( * ) Notice: Subject to any disclaimer, the term of this patent is extended or adjusted under 35 U.S.C. 154(b) by 142 days.

(21) Appl. No.: 17/801,725

(22) PCT Filed: Feb. 26, 2021

(86) PCT No.: PCT/IB2021/051621
§ 371 (c)(1),
(2) Date: Aug. 23, 2022

(87) PCT Pub. No.: WO2021/171246
PCT Pub. Date: Sep. 2, 2021

(65) Prior Publication Data
US 2023/0121129 A1 Apr. 20, 2023

(30) Foreign Application Priority Data

Feb. 28, 2020 (IT) .......................... 102020000004255

(51) Int. Cl.
A22C 15/00 (2006.01)
(52) U.S. Cl.
CPC .......... *A22C 15/005* (2013.01); *A22C 15/001* (2013.01)

(58) Field of Classification Search
CPC ............................ A22C 15/005; A22C 15/001
(Continued)

(56) References Cited

U.S. PATENT DOCUMENTS

| 4,106,174 | A | * | 8/1978 | Ilines | ................... | A22C 15/005 |
| | | | | | | 211/49.1 |
| 5,052,975 | A | * | 10/1991 | Handel | ................ | A22C 15/005 |
| | | | | | | 211/49.1 |

(Continued)

OTHER PUBLICATIONS

Oct. 5, 2021 International Search Report issued in International Patent Application No. PCT/IB2021/051621.

(Continued)

*Primary Examiner* — Richard T Price, Jr.
(74) *Attorney, Agent, or Firm* — Oliff PLC

(57) ABSTRACT

An apparatus for loading and unloading slices of bacon includes a loading portion including: a motor-driven conveying arrangement arranged to convey the slices of fresh bacon; a first motor-driven conveyor arranged to convey the seasoning hooks; a second motor-driven conveyor arranged to receive the seasoning hooks loaded with the slices of fresh bacon, and to move away the seasoning hooks from the loading zone; and a manipulator device configured to load onto the seasoning hooks the slices of fresh bacon. The apparatus further includes: an unloading portion including a motor-driven conveying arrangement, arranged to convey the seasoning hooks, loaded with the slices of seasoned bacon; and a manipulator device cooperating with the conveying arrangement to unload/extract one hook after another of the seasoning hooks from the slices of seasoned bacon.

19 Claims, 11 Drawing Sheets

(58) Field of Classification Search
USPC .......................................................... 452/193
See application file for complete search history.

(56) References Cited

U.S. PATENT DOCUMENTS

| | | | | |
|---|---|---|---|---|
| 5,197,915 | A * | 3/1993 | Nakamura | B65G 43/10 |
| | | | | 452/51 |
| 5,334,088 | A * | 8/1994 | Le-Normand | A22C 15/005 |
| | | | | 452/193 |
| 7,000,816 | B1 * | 2/2006 | Mikelsons | A22C 15/001 |
| | | | | 226/176 |

OTHER PUBLICATIONS

Oct. 5, 2021 Written Opinion issued in International Patent Application No. PCT/IB2021/051621.

* cited by examiner

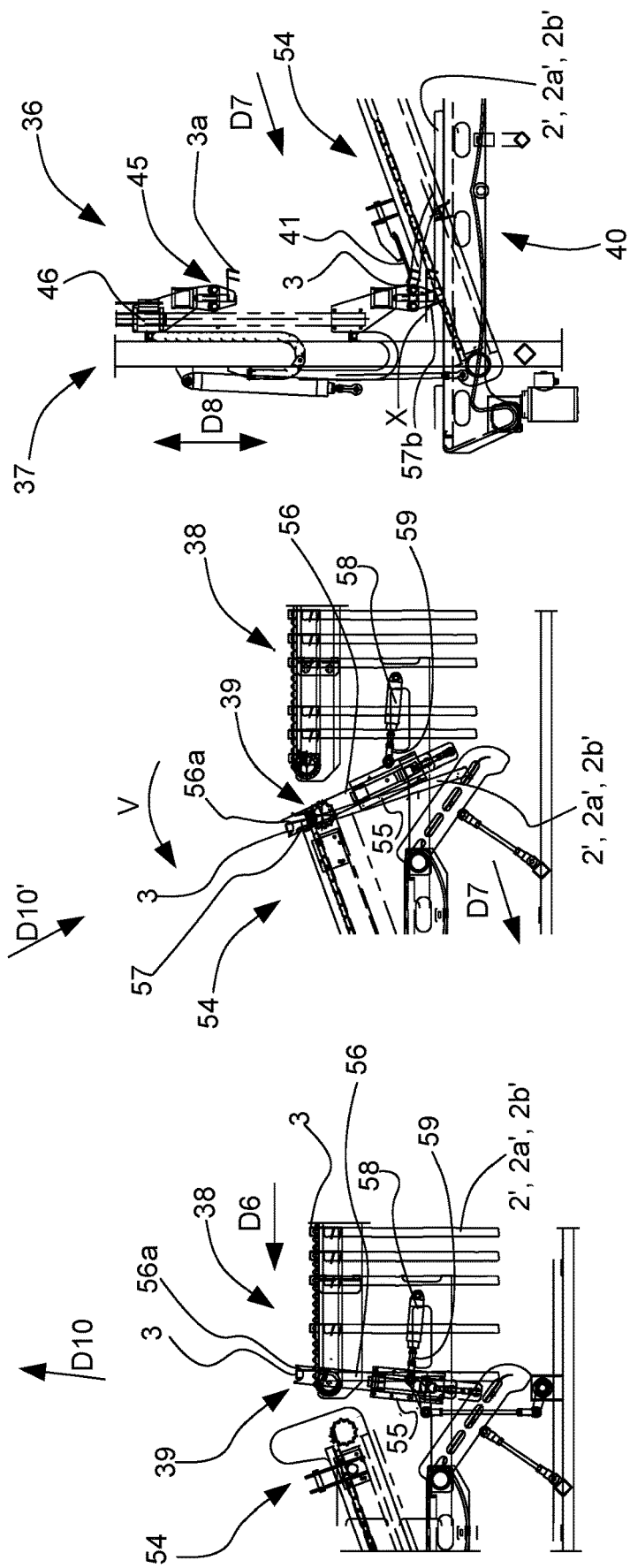

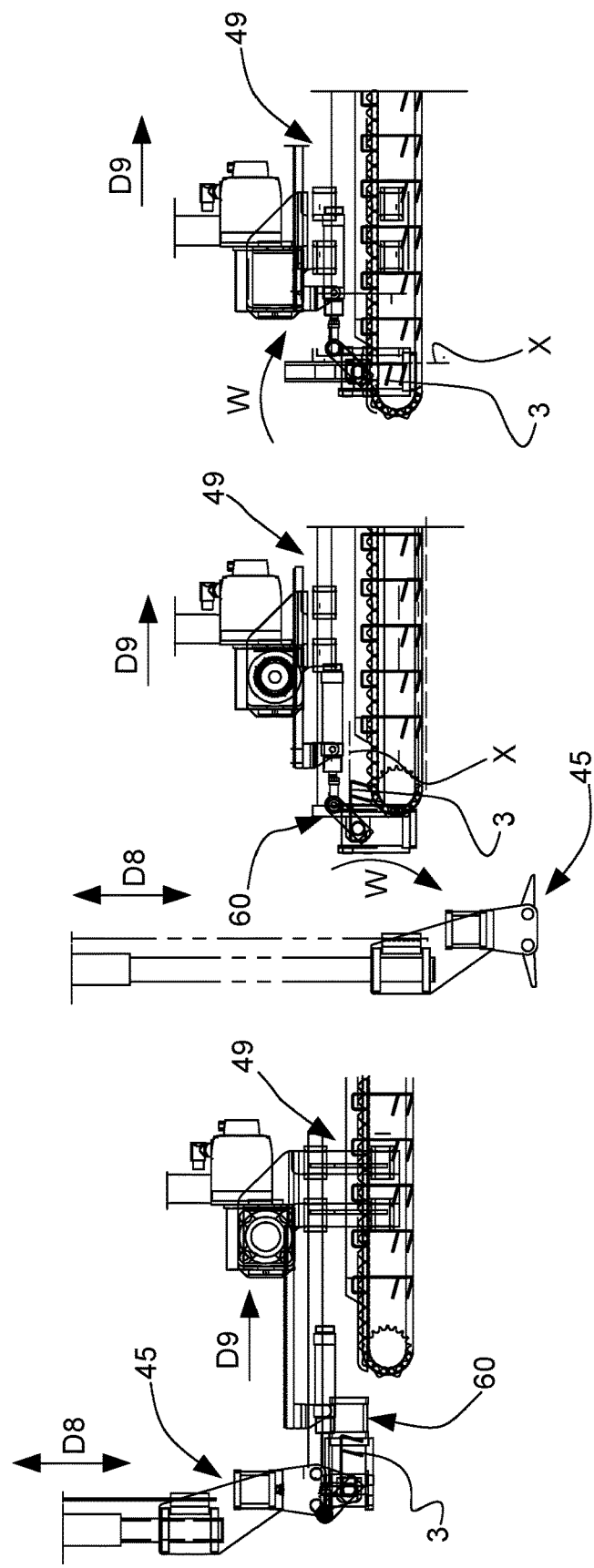

LOADING AND UNLOADING APPARATUS FOR LOADING AND UNLOADING BACON SLICES

The invention relates to an apparatus for loading and unloading slices of meat, in particular slices of meat taken from the belly of a pig, for example slices of bacon.

In particular, the invention relates to an apparatus configured to load slices of fresh bacon onto hooks intended to be hung onto a seasoning frame and to remove from these hooks the slices of seasoned bacon, i.e. after these slices have been smoked, dried, aromatized, and so on.

Apparatuses are known in which the slices of fresh bacon are conveyed as far as a loading zone, where they are loaded manually onto a seasoning hook intended to be inserted onto a seasoning frame. After the seasoning step, the seasoning hooks are removed from the seasoning frame and the slices of smoked, dried and aromatized seasoned bacon are unloaded, also manually, from this seasoning hook. In detail, in the loading zone, an operator inserts manually the teeth of a seasoning hook into an end portion of the bacon, the latter being rested on a resting plane, and hangs manually the hook onto a seasoning frame, which is also called a rack.

Once the pieces of bacon are seasoned, the operator removes the hook manually from the seasoning frame, rests the hook with the bacon on an unloading plane, and removes the teeth of the hook from the bacon.

These tasks are tiring for the worker, in addition to requiring great time to be performed. U.S. Pat. No. 5,334,088 discloses an apparatus for hanging meat products, such as bacons, during processing through a processing chamber, the processing chamber incorporating a conveyor for conveying products through the processing chamber, and a controller for controlling the processing conditions within the processing chamber. The apparatus for hanging products is provided with support bars secured to the conveyor at spaced intervals, to span the width within the processing chamber, and with hooks, each of which in use is be suspended from opposite ends of a support bar by means of connecting means. Each hook includes a generally rectangular frame provided with two parallel rods joined at each end by vertical members and with a plurality of needles members extending from the frame of the hooks and arranged for engaging, each, a respective meat piece.

U.S. Pat. No. 5,052,975 discloses an apparatus that is provided for combing bacon bellies in order to transform a conveyed flow of bacon bellies into a stream of bacon bellies, each of which is suspended from a comb. The thus combed items are then suitable for transport along tracks to subject the bacon belly to treatment conditions such as smoking and flavoring.

One object of the invention is to improve apparatuses of known type to load onto and/or unload from hooks slices of meat, in particular slices of bacon.

Another object is to make available an apparatus for loading the slices of fresh bacon onto hooks and/or unloading the slices of seasoned bacon for these hooks that is simple and cheap to make.

A further object is to make available an apparatus for loading slices of fresh bacon onto hooks intended to be hung on seasoning frames and/or removing the hooks from seasoning frames and unloading the slices of seasoned bacon from these hooks in an automatic or robotized manner.

According to the invention, an apparatus is provided for loading and unloading slices of bacon as defined by the enclosed claims.

Owing to the invention, the slices of fresh bacon can be loaded onto the seasoning frames and/or the slices of seasoned bacon can be unloaded from the hooks completely automatically.

Such purposes and advantages and still others are achieved by the apparatus for loading and/or unloading slices of bacon according to one or more of the claims set out below.

The invention can be better understood and implemented with reference to the attached drawings that illustrate an embodiment thereof by way of non-limiting example, in which:

FIGS. 8A, 8B and 8C are detailed views showing the steps of unloading the slices of seasoned bacon from the respective seasoning hook.

FIGS. 9A, 9B and 9C are detailed views showing the steps of releasing seasoning hooks devoid of the slices of seasoned bacon on a conveying arrangement.

Figure 1:
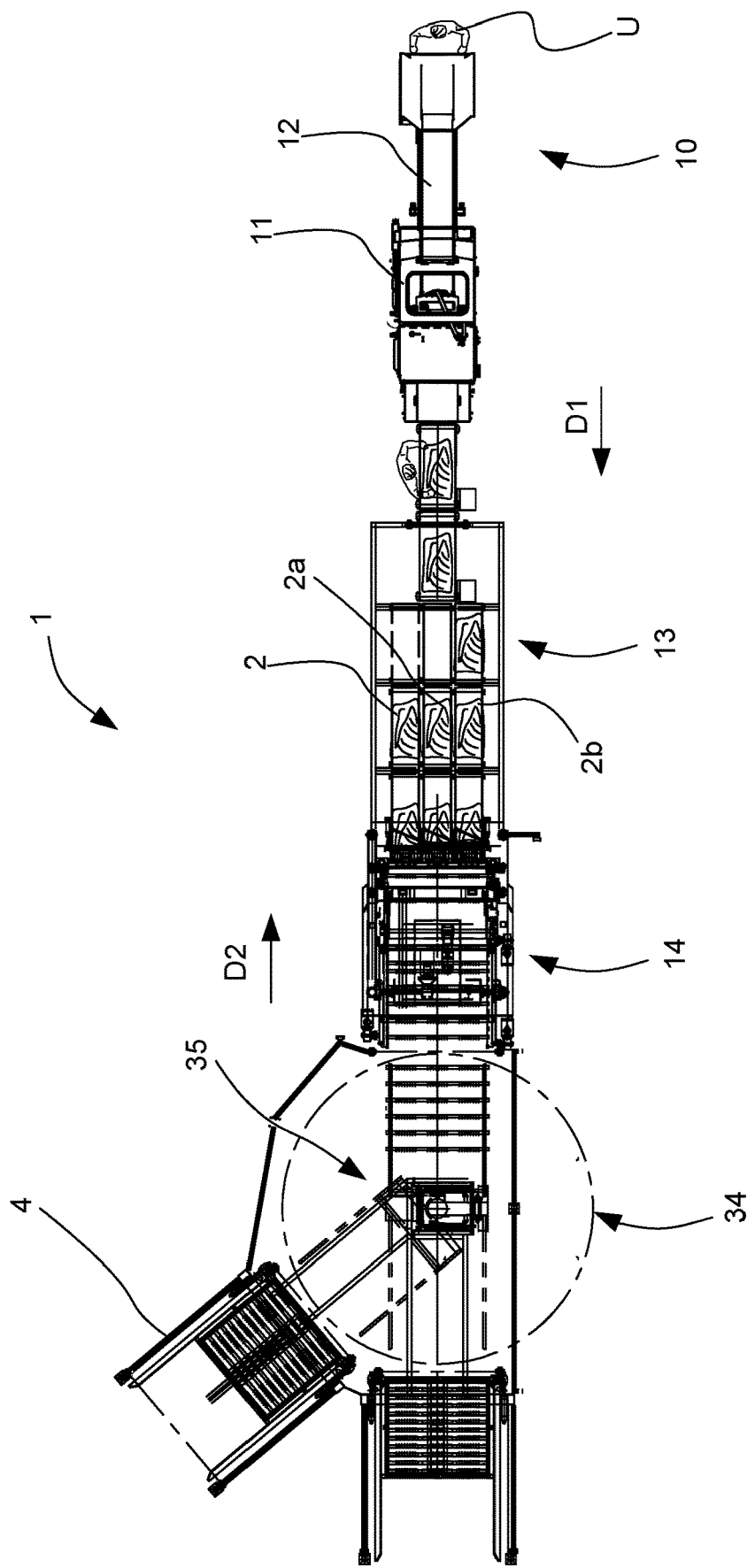
FIG. 1 is a top view of a loading portion of the apparatus according to the invention configured to load automatically slices of fresh bacon onto seasoning hooks.

With reference to the attached Figures, a loading and/or unloading apparatus 1, 1' is shown that rests on a resting plane P. The apparatus 1, 1' includes a loading portion 1 (FIGS. 1 to 5C) configured to load the slices of fresh bacon 2, 2a, 2b, ... onto seasoning hooks 3, 3a, 3b, ... in a loading zone 14 and an unloading portion (FIGS. 6 to 9C) configured to unload the slices of seasoned bacon 2', 2a', 2b' from the seasoning hooks 3, 3a, 3b, ... in an unloading zone 36. The hooks 3, 3a, 3b are fittable removably to a seasoning frame 4.

In the context of the invention, the phrase "slices of fresh bacon" means the raw parts of the belly of pigs that are quartered, trimmed and sprinkled with salt and/or aromas and/or spices; the slices of fresh bacon are soft to the touch and are deformable.

In the context of the invention, the phrase "slices of seasoned bacon" means the slices of aromatized bacon that, after being arranged on the seasoning frames, are left to rest inside refrigerator cells, are dried, smoked and so on; the slices of smoked bacon are less soft to the touch and less deformable than slices of fresh bacon.

The slices of fresh or seasoned bacon, are loaded onto and/or unloaded from seasoning hooks 3, 3a, 3b, as will be explained in detail below. The seasoning hooks 3, 3a, 3b are structurally the same as one another and each hook can include a stick 5 and at least one comb 6, as shown in detail in FIGS. 10A, 10B and 10C.

The comb 6 is the part of the hook arranged to grasp a slice of bacon and the stick 5 is the part of the hook that acts as a support element to support the weight of each comb 6 and of the slice of bacon (when the latter is loaded onto the hook).

Figure 10A:
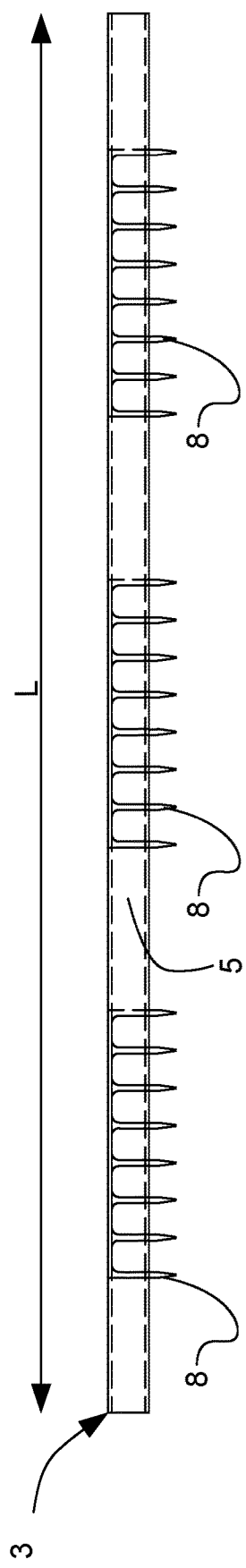
FIG. 10A is a top plan view of a hook usable in the apparatus according to the invention.
Figure 10B:
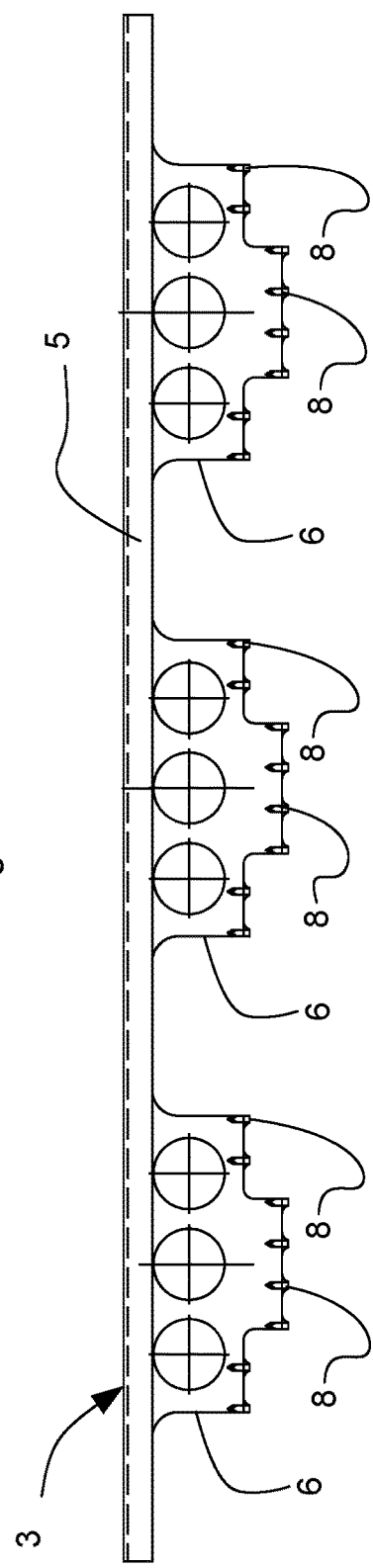
FIGS. 10B and 10C are two side views of the hook of FIG. 10A.
Figure 10C:
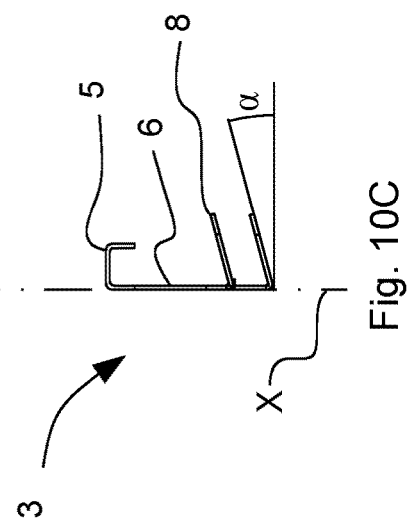

In FIGS. 10A, 10B and 10C, a seasoning hook, for example the hook 3, is shown by way of example, provided with three combs 6 connected to a stick 5. The stick 5 has a length L and each comb 6 is placed at a set distance from the subsequent comb 6 along the length L.

Some portions of the stick 5 between two combs 6, in addition to the end portions of the stick 5, remain free to enable the stick 5 to be grasped, as will be explained in detail below. As shown in FIG. 10C, the stick 5 can have a hook shape to reduce the probability that in the grasped state it may fall accidentally.

The combs 6 can be, for example, welded to the stick 5. The number of combs 6 fitted to the stick 5 can be less or greater than three, on the basis of the length of the stick used. Each comb 6 has a main body that extends along an axis X and is so shaped that a central portion 6a has an extent along this axis X that is greater than at least one side portion 6b, in particular than the two side portions that are contiguous to the central portion 6a.

Each comb 6 is suitable for further supporting the weight of the slices of bacon that are hung on these hooks 3 and supporting the thermal shocks to which the hook is subjected in the refrigerator cells, as will be explained below.

Each comb 6 is provided with a plurality of teeth 8 arranged in a row. As illustrated in FIGS. 10A, 10B and 10C, each comb 6 is provided with eight teeth 8, obviously this number of teeth can vary. Each tooth 8 can be straight or curved.

Each of the teeth is provided with a tip that is inserted into the slices of bacon; the tip of each tooth 8 can be tilted, in particular turned upwards, at an angle $\alpha$ measured with respect to a straight line that is perpendicular to the axis X, as shown in FIG. 10C. The angle $\alpha$ can be comprised for example between five and twenty degrees, in particular fifteen degrees.

The teeth 8 can be more or less near to one another and can be inserted into a slice of bacon. The teeth 8 can for example be thin and close together, or be thicker and spaced apart from one another.

When the stick 5 is arranged on a seasoning frame 4, the tips of the teeth 8 face upwards. This tilt and this orientation of the tips of the teeth 8 enable a slice of bacon to be loaded onto and/or unloaded from the hook 3 more easily, and accidental falls of this slice of bacon to be avoided when the hook 3 is fitted to the seasoning frame 4.

Figure 2:
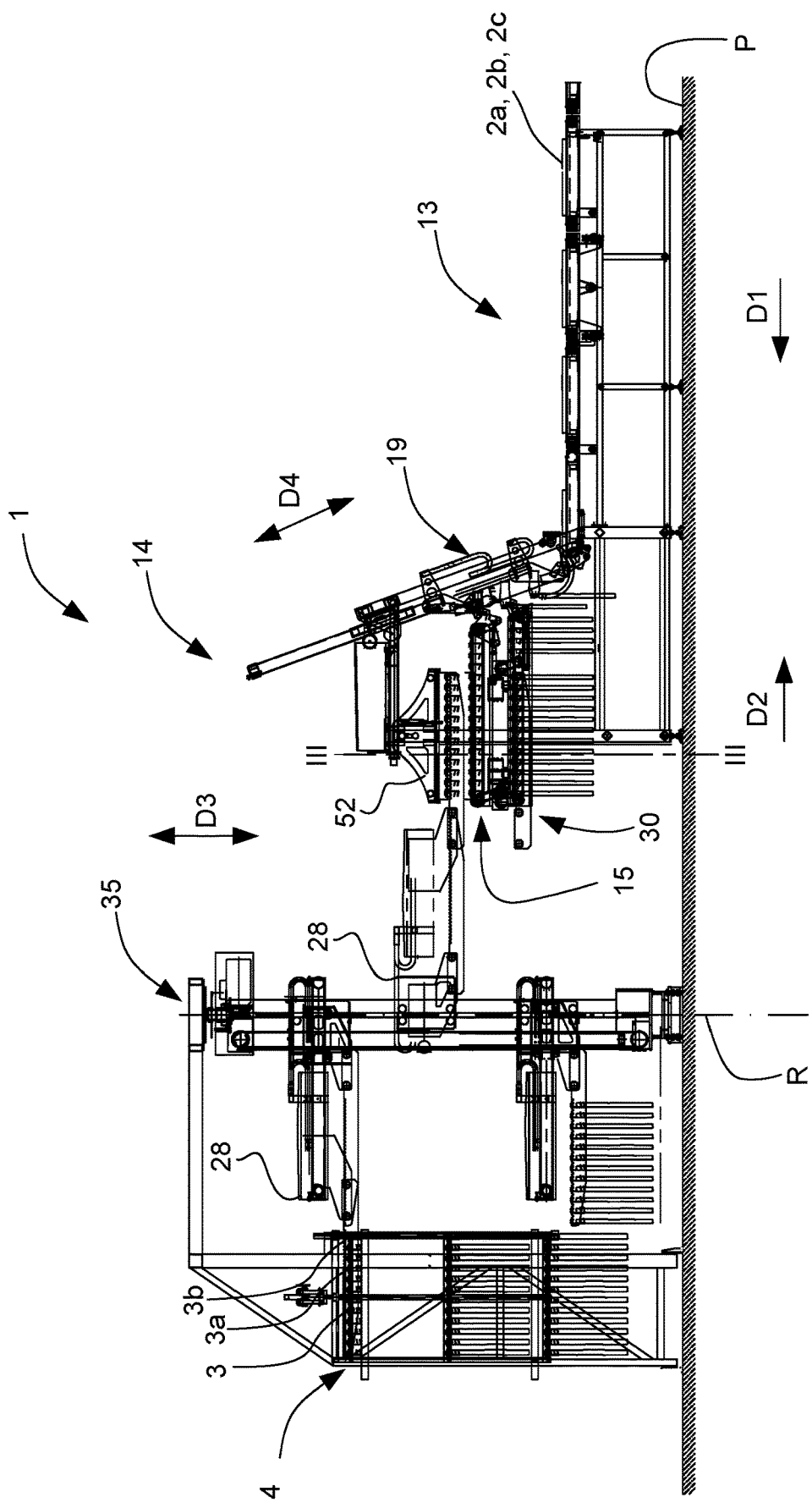
FIG. 2 is a side view of the loading portion of the apparatus of FIG. 1.

As said previously, in FIGS. 1 and 2 a portion of apparatus 1 is shown in which the slices of fresh bacon 2, 2a, 2b are loaded onto the seasoning hooks 3, 3a, 3b, . . . , automatically. This portion of apparatus 1 includes an entrance zone 10 in which one or more slices of fresh bacon 2, 2a, 2b are inserted into the apparatus, and a loading zone 14 arranged to load the slices of fresh bacon 2, 2a, 2b onto the seasoning hooks 3, 3a, 3b, . . . . This portion of apparatus 1 includes a conveying arrangement arranged to convey the slices of fresh bacon 2, 2a, 2b along a conveying direction D1 between the entrance zone 10 and the loading zone 14.

The conveying arrangement can include a conveying member 12 provided with a movable plane on which the slices of fresh bacon are positioned in succession one after the other by an operator U; the conveying member 12 is driven to move the slices of fresh bacon 2, 2a, 2b in the conveying direction D1. The conveying member 12 is provided with an injector 11, i.e. a device provided with a syringe that is insertable into each slice of bacon to flavour the slice of bacon by injecting therein a preset quantity of brine. Downstream of the injector 11 along the conveying direction D1 the operator U can control correct positioning of each slice of fresh bacon on the conveying member 12, to prevent for example strips of bacon being present that protrude beyond the edges of this conveying member 12. The conveying arrangement can include a conveyor belt 13, located downstream of the conveying member 12 along the conveying direction D1, arranged to receive a slice of fresh bacon each time from the conveying member 12 and to convey at least two slices of fresh bacon each time to the loading zone 14.

The conveyor belt 13 in fact includes a conveying plane provided with motor-driven diverters, which are not illustrated, arranged to align automatically at least two slices of bacon on the conveying plane in a direction that is transverse to the conveying direction D1. For example in FIG. 1 the conveyor belt 13 conveys in the conveying direction D1 three slices of fresh bacon 2, 2a, 2b aligned on the loading zone 14. The conveyor belt 13 is connected to a motor, which is not shown, drivable to move the conveyor belt 13 continuously and at a controlled speed. The motor is further drivable to interrupt the movement of the conveyor belt 13 when the slices of bacon reach the vicinity of an end of the conveyor belt 13, for example near a return pulley. The drive of the motor can be controlled by a control device, for example a computer, which is also not shown. When the movement of the conveyor belt 13 is interrupted, an end portion of the slices of fresh bacon protrude beyond the conveying surface, hanging downwards.

With reference to FIGS. 4 and 5A-5C, the end of the conveyor belt 13, for example near the return pulley, is provided with an abutting element 27 arranged to abut on the end portions of the slices of fresh bacon 2, 2a, 2b that protrude downwards from the end portion of the conveyor belt 13 and lift the end portions. The abutting element 27 is rotatable around its own axis of rotation, in one direction of rotation V or in another direction of rotation W opposite the direction of rotation V, to abut on the lower end portions of the slices of fresh bacon 2, 2a, 2b.

The abutting element 27 can include a main body that is substantially fork-shaped, which has a plurality of prongs placed at a set distance from one another so as to form a plurality of passage gaps, as will be clearer in the description.

The abutting element 27 is rotatable around an axis of rotation, which is not shown, between a rest or lowered configuration, in which an abutting surface of the main body 27 is oriented transversely to the conveying direction D1, and a contrasting or raised configuration, in which the abutting surface of the main body 27 is oriented substantially parallel to the conveying direction D1. In the contrasting configuration, the abutting element 27 is rotated to abut below on the end portions of the protruding slices of fresh bacon 2, 2a, 2b and lift the slices of fresh bacon 2, 2a, 2b so that, during lifting of the seasoning hook, the end portions are substantially aligned on the remaining portions of bacon that rest on the conveying surface of the conveyor belt 13.

In the abutting configuration, the passage gaps defined by the prongs of the lower abutting element 27 enable the teeth 8 of the seasoning hook 3 to pass through during the step of loading the slices of fresh bacon in the seasoning hooks, as will be explained in detail below.

The loading portion 1 further includes a transporting arrangement arranged to convey the seasoning hooks 3, 3a, 3b, . . . to the loading zone 14 at least along one transport direction D2, this transport direction D2 being parallel to and opposite the conveying direction D1. The transporting arrangement is shaped to convey the seasoning hooks 3, 3a, 3b, . . . to the loading zone 14 maintaining the seasoning hooks 3, 3a, 3b spaced apart from one another and maintaining the axis X of the combs 6 of the hooks (for example the axis X of the hook 3 shown in FIG. 4) substantially parallel to the direction of the force of gravity. The transporting arrangement can include a first motor-driven conveyor 15 that is movable on a closed-loop path, on which the hooks 3, 3a, 3b, . . . , devoid of the slices of bacon are positioned removably. The hooks, in particular, are positioned in succession on the first motor-driven conveyor 15 to be conveyed along the transport direction D2, as explained below.

Figure 3:
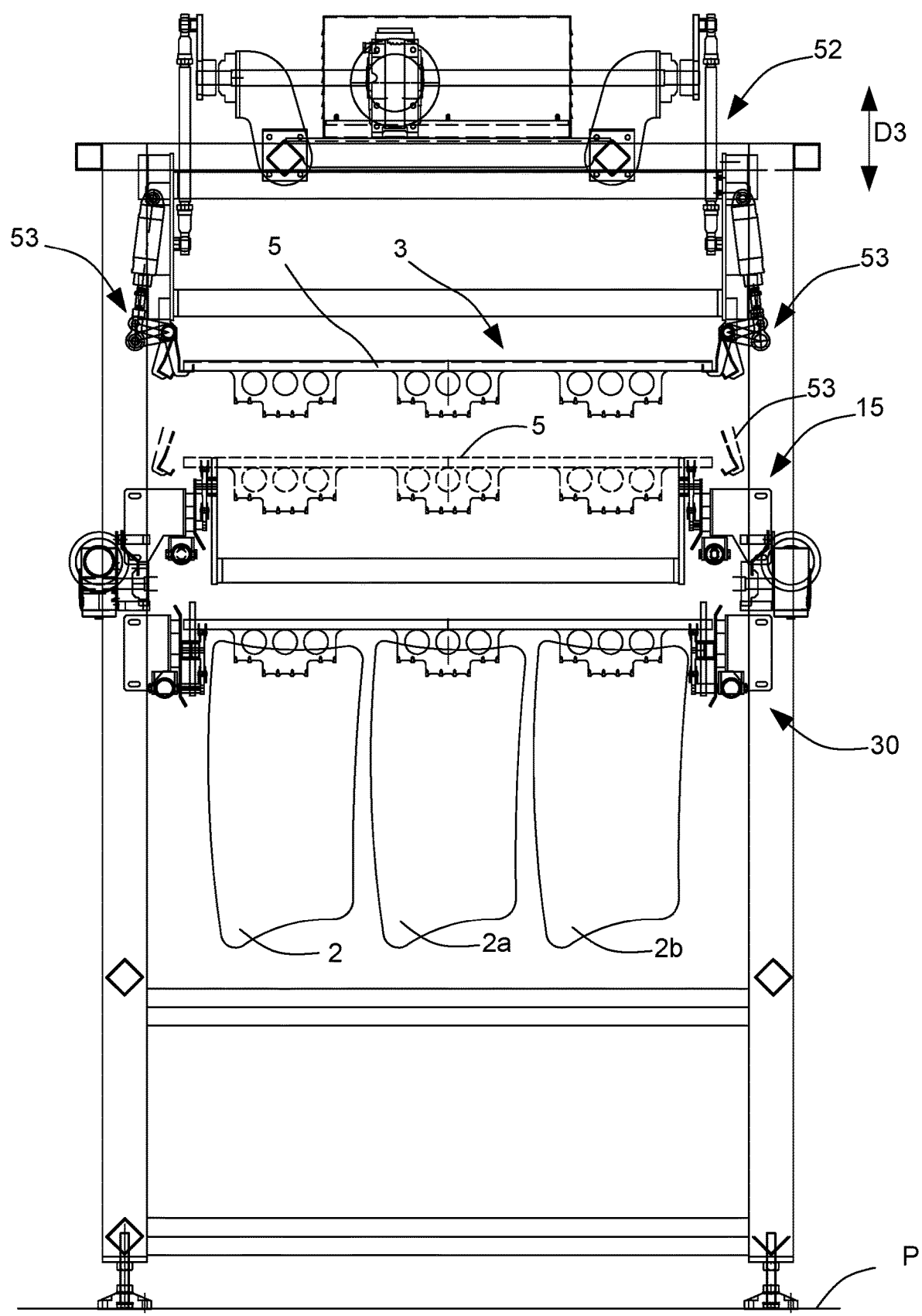
FIG. 3 is a section view taken along plane III-III of FIG. 2.

With reference to FIGS. 2 and 3, in the loading zone 34 a robotic device 35 of known type is provided; the robot device 35 rotates around an axis of rotation R, and is configured to pick up the hooks 3, 3a, 3b, . . . from the seasoning frame 4 and deliver the hooks 3, 3a, 3b, . . . to a storage unit 52. In particular, the robot device 35 is provided with an arm 28 that is movable along a direction that is parallel to the transport direction D2 and/or to another conveying direction D3, transverse to the transport direction D2, to approach the seasoning frame 4 and pick up the hooks 3, 3a, 3b, . . . from the aforesaid seasoning frame 4. The arm 28 is connected to a frame of the robot device 35, is then rotated around the axis of rotation R by a set angular movement so as to align the hooks 3, 3a, 3b, . . . with an entrance zone of the storage unit 52. The arm 28 is thus moved along a direction parallel to the transport direction D2 and/or along another direction parallel to the conveying direction D3, to approach the storage unit 52 and release the hooks inside the storage unit 52. The storage unit 52 is operationally positioned above the first motor-driven conveyor 15. The storage unit 52 has in the section shown in FIG. 3, a structure of portal type and is provided with at least one retaining unit 53 that is drivable to grasp the stick 5 of a hook when it is released from the arm 28, and return the hook to the first motor-driven conveyor 15.

In FIG. 3, two retaining units 53 are shown that are drivable for grasping the two end portions of the stick 5 of the hook, for example the stick of the hook 3 shown in FIG. 3. A single grasping unit could also be provided that is drivable for grasping the central portion of the stick 5.

The retaining unit 53 is movable in the other conveying direction D3, to move the stick 5 of the hook along this other conveying direction D3 and to the hook near the first motor-driven conveyor 15. The retaining unit 53 is further drivable to release a grip of the two end portions of the stick and deliver the two end portions to the first motor-driven conveyor 15, as shown in dotted lines in FIG. 3. The retaining unit 53 can interact with a stick 5 each time.

The first motor-driven conveyor 15 can include a pair of closed-loop conveyors (as visible in the section view of FIG. 3), for example of a chain type, spaced apart from one another so that each conveyor supports/retains a respective end portion of the stick 5, and conveys the hooks along the transport direction D2. The pair of conveyors is spaced apart in a direction that is transverse to a vertical plane, i.e. a plane substantially perpendicular to the resting plane P. The pair of conveyors can be fitted to the uprights of the portal structure of the storage unit 52, but can be provided with its own support structure.

On the first motor-driven conveyor 15, several seats are provided placed at a set distance from one another along the closed-loop path, each seat being conformed to receive the stick 5 of each hook and to move the stick 5 parallel to the transport direction D2 along a branch, for example the upper branch, of the closed-loop path.

The first motor-driven conveyor 15, is in fact provided with a plurality of links of the chain arranged in a row along the transport direction D2; between the pairs of adjacent links seats are defined to receive an end portion of a stick of each hook.

Each grasping unit 53 releases the respective end portion of the stick 5 in these seats. Each hook is conveyed by maintaining the stick 5 in the seat (between two links) with the axis X of the main body of the comb 6 parallel to the direction of the force of gravity.

The loading portion 1 includes a manipulator device 19 arranged to pick up the first motor-driven conveyor 15 one hook after the other and to rotate each thus lifted hook so that the axis X is substantially transverse to the direction of gravity.

The manipulator device 19 is arranged to interact with the first motor-driven conveyor 15 near an end portion of the latter, as will be explained below.

The manipulator device 19 is further configured to move the picked-up hook to the conveyor belt 13, the manipulator device further cooperates with the conveyor belt 13 to load onto each hook (seasoning hooks 3, 3a, 3b, . . . ) the slices of fresh bacon 2, 2a, 2b.

The first motor-driven conveyor 15 is provided with a first slide 20 in an end portion, for example near a return pulley. The end portion faces the manipulator device 19, i.e. the portion in which the first motor-driven conveyor 15 interacts with the manipulator device 19.

The first slide 20 is rotatable around its own axis of rotation between a raised position and a lowered position in the direction of rotation V (for example anticlockwise) or in the other direction of rotation W (for example clockwise), between a raised configuration or position and a lowered configuration. The first slide 20 is connected to an actuating element 20a drivable to rotate the first slide 20 around the axis thereof from a lowered configuration to a raised configuration so as to permit the passage of each hook from each seat of the first motor-driven conveyor 15 on the first slide 20. The first slide 20 is rotatable between a raised configuration in which said pilot is substantially aligned with the upper branch of the closed-loop path, and a lowered configuration in which the pilot is substantially misaligned with the branch of the closed-loop path. The first slide 20 receives the stick 5 in the raised configuration.

The first slide 20 includes a pilot, a sliding plane and a stop portion. When the first slide 20 adopts a raised configuration, the sliding plane is tilted downwards with respect to the transport direction D2. Each hook of the seasoning hooks 3, 3a, 3b, . . . that reaches near the end portion of the first motor-driven conveyor 15 abuts on the pilot of the first slide 20 and disengages from the seat (from the links). Each hook can then slide on the tilted sliding plane and can stop at the stop portion, in the vicinity of the manipulator device 19. Owing to the presence of the tilting sliding plane the hook moves exploiting the force of gravity, but without falling freely.

The first slide 20 can include a pair of plates spaced apart in a direction transverse to a vertical plane substantially perpendicular to the resting plane P.

The manipulator device 19 is configured to pick up the hook from the first slide in the raised position, in particular from the stop portion of the first slide 20. The manipulator device 19 is further configured to move this hook to the conveyor belt 13 where the slices of fresh bacon 2 are arranged, and to insert the teeth 8 into the aforesaid slices of fresh bacon 2.

The manipulator device 19 can include a pair of guides 18 spaced apart in a direction transverse to a vertical plane substantially perpendicular to the resting plane P; the pair of guides 18 extends along an inserting direction D4, oriented transversely to both the conveying direction D1 and to the conveying direction D3. The manipulator device 19 includes a support carriage 23 that is movable along the guides 18 in the inserting direction D4, upwards or downwards.

The manipulator device 19 includes a gripping arrangement 22, fitted to the support carriage 23, suitable for picking up a seasoning hook each time from the first slide 20, in particular from the stop portion, grasping (laterally) the free (end) portions of the seasoning hook, for example the seasoning hook 3. The manipulator device 19 further includes an actuating device 21 connected to the gripping arrangement 22, and drivable along the inserting direction D4 to move the gripping arrangement 22, and the carriage 23, between a pick-up position, in which the gripping arrangement 22 is near the first slide 20, in particular the stop portion of the first slide 20 to pick up the seasoning hook, and a release position in which the gripping arrangement 22 is near an end portion of the conveyor belt 13, to insert the seasoning hook into the slices of fresh bacon 2, 2a, 2b.

Figure 4:
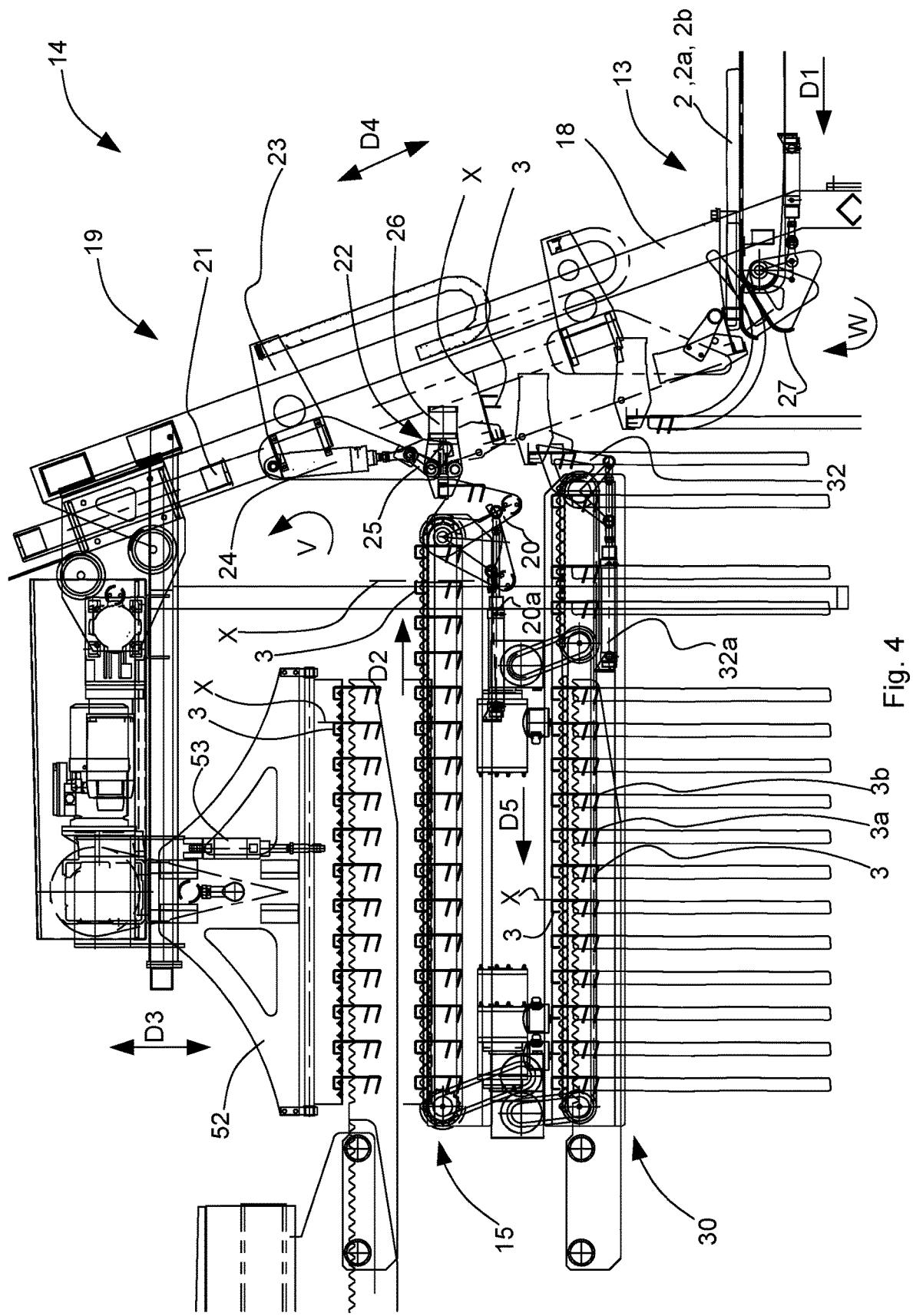
FIG. 4 is an enlarged detail of a loading zone of the loading portion of apparatus of FIG. 1.
Figure 5:
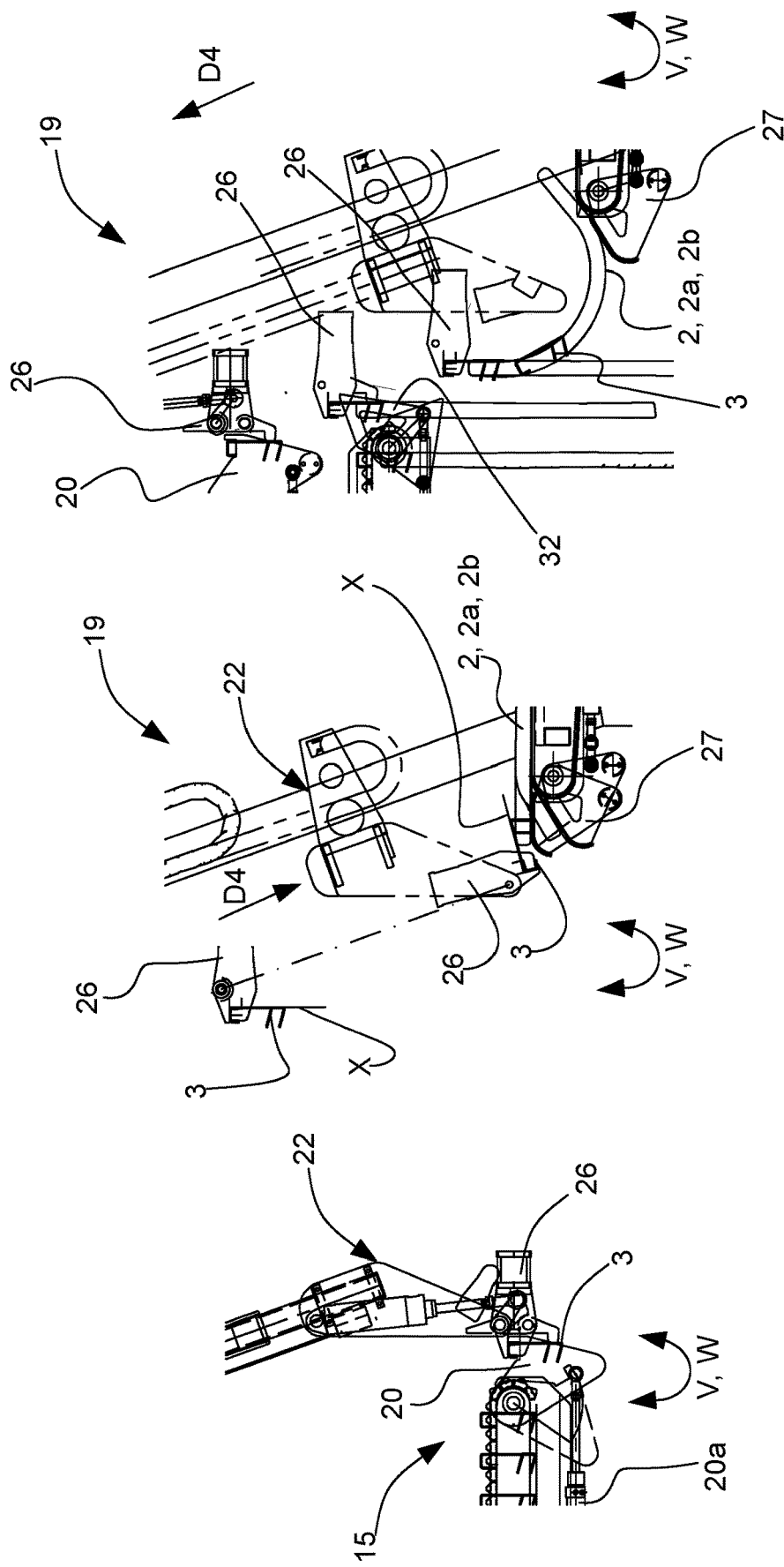
FIGS. 5A, 5B and 5C are detailed views showing the steps of loading the slices of fresh bacon onto a seasoning hook.

The actuating device 21 can include a pair of actuators spaced apart from one another in a direction that is transverse to a vertical plane substantially perpendicular to the resting plane P (in the views of FIGS. 2 and 4 only one actuator is shown, the other is hidden).

The gripping arrangement 22 can include at least one gripper 26; in particular a pair of grippers 26 (in FIGS. 2 and 4 only one gripper is shown, the other one is hidden). The gripper 26 is in fact drivable to close to grasp a free end portion of the stick 5, and open to free the end portion. The at least one gripper 26 includes two jaws, one of which is fixed and one of which is movable. The at least one gripper 26 is drivable to close and grasp the free end portion of the stick 5 at the stop portion of the first slide 20. The at least one gripper 26 is rotatable around an axis of rotation that is not illustrated, and can rotate in the direction of rotation V, illustrated for example in FIG. 4, or in the other direction of rotation W, opposite the direction of rotation V. The at least one gripper 26 can rotate by a set angle of rotation, for example comprised between ±60 and ±120 degrees, in particular ±100 degrees.

The gripping arrangement 22 further includes an actuating unit 24 connected to the at least one gripper 26 to rotate the gripper 26 around a rotation axis thereof in the direction of rotation V, or in the opposite rotation axis W. By the rotation of the gripper 26, the grasped hook 3 is rotated from a position in which the axis X of the hook is parallel to the direction of gravity, to another position in which the axis X is transverse to this direction.

The actuating unit includes at least one linear actuator 24—in particular a pair of linear actuators, each actuator connected to a respective gripper 26—provided with a rod that is movable inside a cylinder.

The at least one linear actuator 24 is hinged on the support carriage 23. One end of the rod of the at least one linear actuator 24 is connected rotatably to an end of a rod 25, another end of the rod 25 is connected to the gripper 26, for example by a toothed connection. The angular position of the rod 25 can thus vary on the basis of the position occupied by the rod in the cylinder of the linear actuator 24; a variation of the angular position of the rod 25 thus causes the rotation of the gripper 26 in the direction of rotation V or in the opposite direction of rotation W.

In use, in the pick-up position the at least one gripper 26 closes and grasps the end portions of the stick 5 positioned on the stop portion of the first slide 20 in the raised configuration, as shown in FIG. 5A. The actuating device 21 is driven to move the gripper 26 downwards along the inserting direction D4. The stick 5 is thus moved along the inserting direction D4, disengaging from the stop portion. This simultaneously causes rotation of the first slide 20 around the axis thereof in the other direction of rotation W, downwards and in the lowered configuration thereof. When passing from the pick-up position to the release position, the actuating unit 24 is driven to rotate the gripper 26 in the direction of rotation V. Also the hook 3, locked between the jaws of the gripper 26, is rotated in the direction of rotation V, as described previously. When the tips of the teeth 8 are rotated they face the upper side of the slices of fresh bacon 2, 2a, 2b, i.e. the axis X is oriented transversely to the direction of the force of gravity.

By driving the actuating element 20a connected to the first slide 20, the latter is returned to the raised configuration to receive a subsequent hook rotated in the direction of rotation V.

Simultaneously, the slices of fresh bacon 2, 2a, 2b reach the vicinity of the end portion of the conveyor belt 13, for example in the vicinity of the return pulley of the conveyor belt 13. The conveyor belt 13 is stopped and the abutting element 27 is rotated to abut on the lower end portions of the slices of fresh bacon 2, 2a, 2b and raise the slices of fresh bacon 2, 2a, 2b.

In the lowered position of the gripping arrangement, the teeth 8 are inserted into the end portions of the slices of fresh bacon 2, 2a, 2b, passing through the prongs of the abutting element 27.

Owing to the passage gaps between the prongs of the abutting element 27, the teeth 8 are inserted easily into the end portions of the slices of bacon 2 without encountering obstacles. The slices of fresh bacon 2, 2a, 2b are loaded onto the hook.

The control arrangement is configured also to control the operations of the manipulator device 19 and to coordinate the cooperation operations between the manipulator device 19, the first motor-driven conveyor 15 and the conveyor belt 13 disclosed above. The control arrangement is configured to control the speed of the manipulator device 19 so that it picks up one hook at a time in coordination with an arrival of the hook in an end portion of the first motor-driven conveyor 15, for example on the first slide. The portion of apparatus 1 is provided with a further transporting arrangement arranged to move away from the loading zone 14 the seasoning hooks 3, 3a, 3b, . . . loaded with the slices of fresh bacon 2, 2a, 2b and to convey the seasoning hooks 3, 3a, 3b, . . . to the fitting zone 34 where these hooks 3, 3a, 3b are fitted to a seasoning frame 4.

The further transporting arrangement can include a second motor-driven conveyor 30 defining a closed-loop path. The second motor-driven conveyor 30 is arranged to interact with the gripping arrangement 22 so as to receive the loaded seasoning hooks 3, 3a, 3b, . . . (or rather each loaded with the slices of fresh bacon 2, 2a, 2b) and convey the loaded seasoning hooks 3, 3a, 3b, . . . to the fitting zone 34. The second motor-driven conveyor 30 is positioned in the vicinity of the manipulator device 19 to facilitate this interaction.

The second motor-driven conveyor 30 extends in a feeding direction D5, parallel to the conveying direction D1, or parallel to and opposite the transport direction D2, and can include a conveyor of belt or chain type. The second motor-driven conveyor 30 can be operationally positioned at a lower height than the height of the first motor-driven conveyor 15, this height being measured in a direction that is substantially parallel to the direction of the force of gravity.

The second motor-driven conveyor 30 can include a pair of closed-loop conveyors (in the views of FIGS. 2 and 4 only one conveyor is shown, the other is hidden) spaced apart from one another so as to support or retain other free end portions of the stick 5, or in general those portions that are not engaged by the gripper 26, and convey the hooks with the slices of bacon along the feeding direction D5. The pair of conveyors is spaced in a direction that is transverse to a vertical plane, i.e. a plane substantially perpendicular to the resting plane P.

The second motor-driven conveyor 30 can be similar structurally to the first motor-driven conveyor 15. The second motor-driven conveyor 30 defines a closed-loop path that extends along the feeding direction D5; on the second motor-driven conveyor 30 a plurality of seats is provided located at a distance from one another along the closed-loop path, each seat being conformed to receive the stick 5 of each hook released by the gripping arrangement 22 and to move the stick 5 along a branch, for example the upper branch of the closed-loop path parallel to the feeding direction D5.

The second motor-driven conveyor can include a multi-step conveyor, i.e. can include more than two pairs of conveyors placed in succession along the feeding direction D5, seats being provided as described above on each pair of conveyors. The distance between at least two consecutive seats of a pair of conveyors can be different from the distance between at least two further consecutive seats of the other pair of conveyors. This enables the hooks to be brought nearer or further away on the basis of the thickness of the conveyed fresh bacon.

The second motor-driven conveyor 30 is provided with a plurality of links arranged in a row along the feeding direction D5; between adjacent pairs of links, a seat being defined to receive also the end portion of the stick 5 of the hook that is free, i.e. not engaged by the grip of the gripper 26.

The second motor-driven conveyor 30 (or the pair of conveyors) can be fitted to the uprights of the portal structure of the storage unit 52, but can also be provided with its own support structure.

The second motor-driven conveyor 30 can be provided with a second slide 32 in an end portion, for example near a return pulley. The end portion is the portion facing the manipulator device 19, in which the second motor-driven conveyor 30 interacts with the gripping arrangement 22.

The second slide 32 is rotatable around its own axis of rotation, in the direction of rotation V or in the other direction of rotation W, between a raised position and a lowered position. The second slide 32 is connected to an actuating element 32a drivable to rotate the second slide 32 around the axis thereof from a lowered position to a raised position, similarly to what has been disclosed for the first slide 20, to the description of which reference is made. In the raised position, the second slide 32 interacts with the gripper 26 and enables each loaded hook to be transferred from the gripper 26 to the seat of the second motor-driven conveyor 30. The second slide 32 includes a guide plane.

In use, the second slide 32 adopts a raised position. In use, the actuating device 21 is driven to move the gripper 26 upwards along the inserting direction D4. The hook, for example the hook 3, grasped by the gripper 26 and loaded with the slices of fresh bacon 2, 2a, 2b, moves upwards along the inserting direction D4. The control arrangement is configured to control the speed of the manipulator device 19 so that it releases a hook loaded with the slices of fresh bacon 2, 2a, 2b each time in coordination with an arrival of a seat of said second motor-driven conveyor 30, as explained below. The control arrangement is configured to control the upward advancement step of the gripper 26, and to slow down, or even arrest, the advancement of the gripper 26 when the gripper 26 is substantially at the height of, or at a slightly greater height than, that of the second motor-driven conveyor 30. The advancement of the gripper 26 is then slowed, or arrested, when it is substantially at the height of or slightly above, the height of the second slide 32 in raised position. Simultaneously, the gripper 26 is rotated in the other direction of rotation W, the grasped hook is thus rotated so that the axis X moves from being substantially transverse to the direction of the force of gravity to being parallel to this direction. Also the slices of fresh bacon 2, 2a, 2b are rotated from a substantially horizontal position occupied on the conveyor belt 13 to a substantially vertical position.

In use, the gripper is driven to open, freeing the end portions of the stick 5, which falls through gravity onto the guide plane of the second slide 32. The guide plane of the second slide 32, in raised position, is tilted downwards with respect to the feeding direction D5, and oriented to the seats of the second motor-driven conveyor 30. The stick 5 of the hook can then slide on the guide plane and be inserted into a seat (defined by two consecutive links) of the second motor-driven conveyor 30. Owing to the presence of the guide plane of the second slide 32 the hook moves by exploiting the force of gravity, but without dropping in free fall.

The advancement along the inserting direction D4 upwards of the open gripper 26 continues, or resumes, and the cycle of picking up an empty hook from the first motor-driven conveyor 15 restarts. The second slide 32 can return to the lowered position through the effect of its weight, or alternatively the actuating element 32a can be driven to return the second slide 32 to the lowered position.

The hooks 3, 3a, 3b, . . . , each loaded with the fresh hams 2, 2a, 2b, and positioned on the second motor-driven conveyor 30, are moved in the feeding direction D5 to the loading zone 34. In the loading zone 34 the robot device 35, rotates around an axis of rotation R, and is configured to pick up the hooks 3, 3a, 3b, . . . from the second motor-driven conveyor 30 by the arm 28, and load the hooks 3, 3a, 3b, . . . onto the seasoning frame 4.

Each seasoning frame 4 is then conveyed to a seasoning zone where it is inserted into refrigerator cells. At the end of the seasoning process, slices of seasoned bacon are obtained, indicated below with the numeric references 2', 2a', 2b'.

After being inserted into the refrigerator cells, the bacon is maintained for at least fifteen days at a temperature comprised between 3 and −5 degrees Celsius in an atmosphere having humidity comprised between 70-80%. In the refrigerator cells, the bacon is also turned periodically.

Subsequently, a scraping operation can be provided to remove possible processing residues and excess salt and spices; possibly a rolling operation is conducted with the possible addition of lean meat, binding and covering of the outer parts devoid of rind with strips of pig bladder and vegetable paper. The bacon is then left for a few hours at a temperature of 0-5 degrees Celsius, and is subsequently dried at a temperature comprised between about 17 and 20 degrees Celsius and with relative humidity of 75-80% and for a maximum time of seven days. In the seasoning zone, it is further provided for the bacon to mature for a period that is not less than 60 days, in environments in which the temperature is comprised between 10 and 14 degrees Celsius. As disclosed previously, in FIGS. 6 and 7 an unloading portion 1' of the apparatus is shown that is configured to unload automatically in an unloading zone 36 the seasoning hooks 3, 3a, 3b, . . . from the slices of seasoned bacon 2', 2a', 2b'.

In this unloading portion 1', a further motor-driven conveying arrangement 38, 40, 54 is provided that is arranged to convey the seasoning hooks 3, 3a, 3b, . . . , each loaded with slices of seasoned bacon 2', 2a', 2b', between the seasoning zone and the unloading zone 36. The further conveying arrangement conveys the seasoning hooks 3, 3a, 3b, . . . maintaining the seasoning hooks 3, 3a, 3b spaced apart from one another.

The further conveying arrangement can include a third motor-driven conveyor 38 configured to receive the seasoning hooks 3, 3a, 3b, . . . from the arm of the robot device 35. The arm 28 of the robot device 35 is configured to pick up the seasoning frame 4 from the seasoning zone, pick up from the aforesaid seasoning frame 4 a hook of the seasoning hooks 3, 3a, 3b, . . . each time, and release the hook on the third conveyor 38. The third conveyor 38 can be of the closed-loop type, for example of a chain type. The third conveyor 38 is arranged to move the loaded seasoning hooks 3, 3a, 3b, . . . , along a first unloading direction D6, substantially perpendicular to the direction of the force of gravity, or substantially parallel to the conveying direction D1. The third conveyor 38 is structurally similar to the first motor-driven conveyor 15 or to the second motor-driven conveyor 30.

The third conveyor 38 can include a pair of closed-loop conveyors of chain type (in the views of FIG. 7 only one conveyor is shown, the other is hidden) spaced apart from one another so as to support or retain free end portions of the stick 5, and convey the hooks with the slices of bacon along the first unloading direction D6. The pair of conveyors is spaced in a direction that is transverse to a vertical plane, i.e. a plane substantially perpendicular to the resting plane P.

The third conveyor 38 extends along the first unloading direction D6 and defines a closed-loop path. On the third conveyor 38, a plurality of seats is provided that is located at a distance from one another along the closed-loop path, each seat is conformed to receive the stick 5 of each hook loaded with the slices of seasoned bacon 2', 2a', 2b', and to move it along a branch, for example the upper branch, of the closed-loop path parallel to the first unloading direction D6. The third conveyor 38 can be a multi-step conveyor, as disclosed for the second motor-driven conveyor 30, to the description of which reference is made.

The third conveyor 38 is in fact provided with a plurality of links (of the chain) arranged in a row along the first unloading direction D6; the seat for receiving the end portion of the stick 5 of the hook released by the arm 28 being defined between pairs of adjacent links. The third conveyor 38 moves the loaded hooks to the unloading zone 36, maintaining the seasoning hooks 3, 3a, 3b spaced apart from one another and maintaining the axis X of each comb 6 substantially parallel to the direction of the force of gravity.

The further conveying arrangement can include a fourth motor-driven conveyor 54, arranged to receive the seasoning hooks 3, 3a, 3b, . . . from the third conveyor 38. The fourth conveyor 54 can include a pair of closed-loop conveyors (in the views of FIG. 7 only one conveyor is shown, the other is hidden) of chain type, spaced apart from one another so as to support or retain free end portions of the stick 5. The fourth conveyor 54 receives the seasoning hooks 3, 3a, 3b, . . . in an inlet portion of the fourth conveyor 54, for example a portion near an outlet end of the third conveyor 38. The inlet portion of the fourth conveyor 54 and the outlet end of the third conveyor 38 can be substantially aligned along the first unloading direction D6 at the same vertical position.

The fourth conveyor 54 can extend along a second unloading direction D7, transverse to the first unloading direction D6, and tilted downwards.

The inlet portion and an exit portion of the fourth conveyor 54 are staggered in height, measured in the direction parallel to the direction of the force of gravity. The fourth conveyor 54 can be provided with conveying elements 57a, 57b, 57c, . . . shaped for example in the shape of a cup or crib, visible in detail in FIG. 7A, and movable along the second unloading direction D7; each conveying element 57a, 57b, 57c, . . . being conformed to receive a free end portion of the stick 5. Each conveying element 57a, 57b, 57c, . . . moves along the second unloading direction D7 by moving the loaded hooks to the unloading zone 36, maintaining the seasoning hooks 3, 3a, 3b spaced apart from one another, and permitting a rotation of the seasoning hooks 3, 3a, 3b as will be explained below.

The fourth conveyor 54 is arranged to receive the seasoning hooks 3, 3a, 3b, . . . from the third conveyor 38 via a transfer device 39 of the apparatus, in particular with which the fourth conveyor 54 can be provided.

Figure 7:
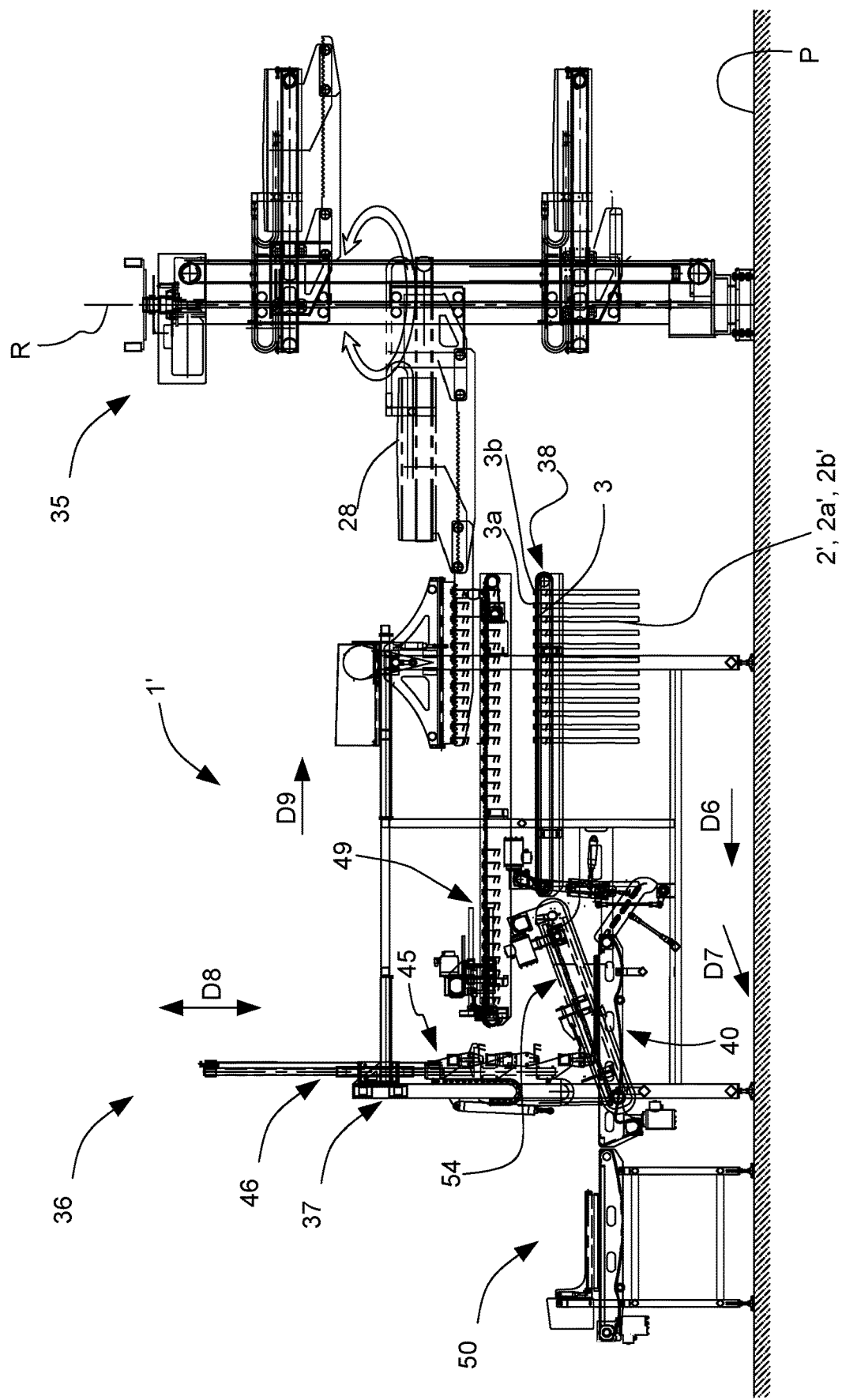
FIG. 7 is a vertical raised side view of the unloading portion of the apparatus of FIG. 6.
Figure 7A:
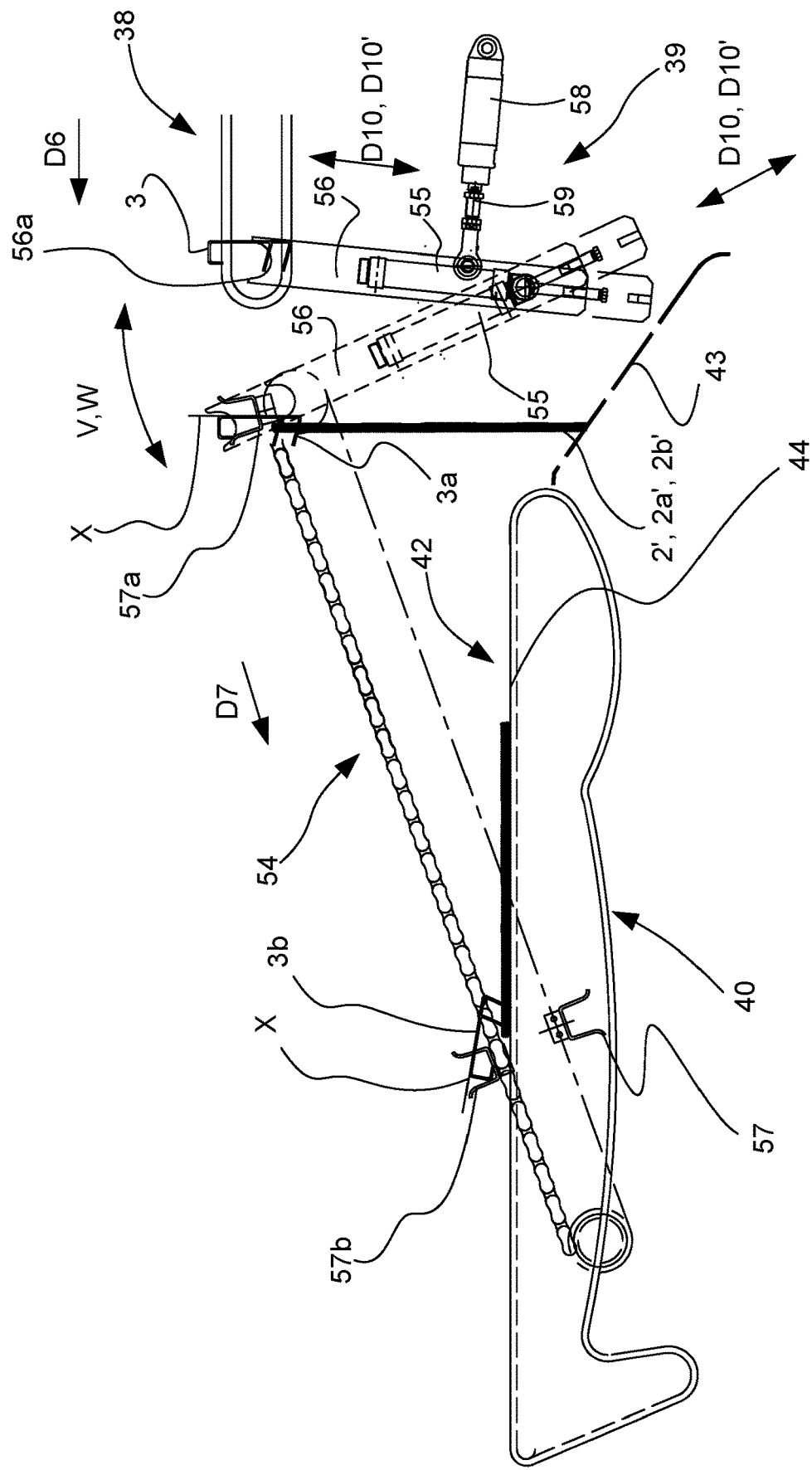
FIG. 7A is an enlarged detail of FIG. 7 of an unloading zone for unloading the slices of seasoned bacon from the hooks.

The transfer device 39, shown in detail in FIGS. 7A, 8A and 8B, is arranged to pick up a hook each time from the third conveyor 38 and transfer the hook to the fourth conveyor 54. In particular, the transfer device 39 can pick up the hook at the outlet end of the third conveyor 38 and release the hook of the conveying elements 57 at an inlet portion of the fourth conveyor 54.

The transfer device 39 can include a first linear actuator 55, 56 of known type, for example of pneumatic type. The linear actuator can include a cylinder 55 and a rod 56 connected to the cylinder and movable with respect to the cylinder 55 along an upward direction D10 and a downward direction D10'. The cylinder 55 is fixed rotatably, in particular hinged, on a support frame of the fourth conveyor 54 to rotate around its own axis of rotation in the direction of rotation V or in the other direction of rotation W. An end portion of the rod 56 includes a concave surface 56a. The concave surface 56a can be of semicircular type (as illustrated in FIGS. 7 and 8A-8C) and is intended to interact with a portion of the stick 5 of the hook at the outlet end of the third conveyor 38 to pick up the hook from the latter. The transfer device 39 can include another linear actuator of known type, which is also of pneumatic type. The other linear actuator can include another cylinder 58 and another rod 59 that is movable with respect to the cylinder 58. One end of the other rod 59 is connected, in particular hinged, to the cylinder 55. When the other actuator 58, 59 is driven, a movement of the rod 59 causes a rotation of the cylinder 55 around the rotation axis thereof in the direction of rotation V or in the other direction of rotation W.

In use (as shown in FIGS. 8A, 8B and 8C), when the hook, for example the hook 3, reaches the outlet end of the third conveyor 38, the linear actuator 55, 56 is driven to disengage the hook from the seat of the third conveyor. In particular, the end portion of the rod 56 is movable inside the cylinder 55 along the upward direction D10 and the downward direction D10'.

In use, the rod 56 is moved upwards along the upward direction D10 to contact the free portion of the hook, lifting the hook or removing the hook from the seat of the third conveyor 38. In use, the other linear actuator 58, 59 is driven to rotate the linear actuator 55, 56 in the direction of rotation V. Driving the other linear actuator 58, 59 is arrested when the rod 56 is near the inlet portion of the fourth conveyor 54. A rotated configuration adopted by the linear actuator 55, 56 is illustrated by dotted lines in FIG. 7A.

In use, the linear actuator 55, 56 is driven to release the hook on one of the conveying elements 57, 57a, 57b, . . . of the fourth conveyor 54. In particular, the end portion of the rod 56 is moved downwards along the downward direction D10' to take the free portion of the hook to abut on and rest on the conveying element. Thus the cycle of the transfer device 39 restarts to remove a subsequent hook from the third conveyor 38 and transfer the hook to the fourth conveyor 40. In FIG. 7A, a simplified view is shown of the disclosed steps, in which the linear actuator 55, 56 in a rotated configuration and in which it cooperates with the fourth conveyor 54, is shown with dotted lines.

The further conveying arrangement can include a fifth motor-driven conveyor 40 that is mobile and closed-loop and arranged to cooperate the transferring elements 57, 57a, 57b, . . . of the fourth conveyor 54 to rotate the seasoning hooks 3, 3a, 3b, . . . , whilst the aforesaid transferring elements 57, 57a, 57b, . . . moves to the end portion of the fourth conveyor 40 (to the unloading zone 36) along the second unloading direction D7, so that the axis X of each hook changes from being oriented parallel to the direction of the force of gravity to being oriented transversely to the direction of the force of gravity.

The fifth motorized conveyor 40 extends in a direction that is transverse to a vertical plane, i.e. a plane substantially perpendicular to the resting plane P. The fifth motorized conveyor 40 can be a belt conveyor.

The fifth motorized conveyor 40 can also be provided with a receiving surface 42 suitable for abutting on the slices of seasoned bacon 2', 2a', 2b', loaded onto the seasoning hooks 3, 3a, 3b, . . . and in turn conveyed by the conveying elements 57, 57a, 57b.

The extent along this transverse direction of the fifth motorized conveyor 40 is less than the extent of the fourth conveyor 54. The fifth motorized conveyor 40 can be positioned for example between two support frames that support the chains of the fourth conveyor 54. Further, the tilt of the fourth conveyor 54 along the second unloading direction D7 is such that the two end portions of the fourth conveyor 54 are staggered in height, in particular such that one end is positioned above the receiving surface 42, whilst another end is positioned substantially below the receiving surface 42.

This explains why in FIGS. 7B in 8C it appears that the transferring elements 57, 57a, 57b, and the fourth conveyor 54, traverse the receiving surface 42.

The receiving surface 42 includes a pilot surface 43 placed at a vertical distance from the fourth conveyor 54 that cooperates with the conveying elements 57, 57a, 57b, . . . to rotate the hooks. In other words, whilst the conveying elements 57, 57a, 57b, . . . move along the second unloading direction D7 to the end portion of the fourth conveyor 54, the slices of seasoned bacon 2', 2a', 2b' abut and run on the pilot surface 43. The sliding contact between the end portions of the slices of seasoned bacon and the pilot surface 43, and the downward movement of the conveying elements 57, 57a, 57b, . . . , mean that the slices of bacon vary angular position with respect to the pilot surface 43, tending to adopt a tilted position. The angular variation of the slices of bacon accordingly causes rotation of the seasoning hooks 3, 3a, 3b, . . . inside the conveying elements 57, 57a, 57b, . . . .

The downward tilt of the fourth conveyor 54 facilitates this abutment and sliding. The receiving surface 42 further includes a flat support surface 44, adjacent to the pilot surface 43, and extending in a direction parallel to the first unloading direction D6. The support surface 44 cooperates with the conveying elements 57, 57a, 57b, . . . to rotate the hooks further. In other words, the sliding contact between the portions of the slices of seasoned bacon and the support portion 44, and the downward movement of the conveying elements 57, 57a, 57b, . . . , make sure that the slices of bacon continue to vary the angular position with respect to the support surface 44, tending to adopt a horizontal position, i.e. parallel to the first unloading direction D6. In a pick-up zone of the support surface 44 for example illustrated in FIG. 8C, the slices of seasoned bacon 2', 2a', 2b' are in a horizontal position, i.e. one face thereof rests on the support surface 44, and the axis X of the seasoning hooks 3, 3a, 3b (for example of the seasoning hook 3b) and is maintained substantially perpendicular to the direction of the force of gravity and substantially parallel to the first unloading direction D6; the hooks 3, 3a, 3b are all positioned in a respective conveying element 57, 57a, 57b, . . . .

On the basis of what has been described above, a pick-up zone is a zone of the support portion 44, or of the receiving surface 42, in which the conveying elements 57, 57a, 57b, . . . , traverse externally the receiving surface 42, i.e. outside the side edges of the receiving surface 42.

The unloading portion 1' includes a further manipulator device 37 cooperating with the further conveying arrangement to unload, or extract, one hook after the other of the seasoning hooks 3, 3a, 3b, . . . from the slices of seasoned bacon 2', 2a', 2b'. The manipulator device 37 is further configured to remove the hook extracted from the further conveying arrangement and to rotate the hook so that the axis X of the combs 6 is substantially parallel to the direction of the force of gravity.

The further manipulator device 37 is provided with a further gripping arrangement 45, so as to grasp a hook each time from the receiving surface 42 of the fifth motorized conveyor 40 so as to extract the hook from the slices of seasoned bacon 2', 2a', 2b'.

The further gripping arrangement 45 has a structure that can be similar to the gripping arrangement 22.

The further gripping arrangement 45 can include at least one gripper, the structure of which is identical to that of the previously disclosed gripper 26, and to which reference is made for the description. The further gripping arrangement 45 is drivable to grasp a free portion of the stick 5 of the hook, and/or to open so as to free this free portion.

The further gripping arrangement 45 is drivable to close and grasp the free portion of the stick 5 at the support surface 44 of the fifth motorized conveyor 40, in particular in the pick-up zone of the support portion.

The further manipulator device 37 is provided further with a further actuating device 46 connected to the further gripping arrangement 45 and drivable along a removal direction D8, transverse to the first unloading direction D6, to move the gripping arrangement 45 between a lowered position in which the gripping arrangement 45 is near the support surface 44 to grasp at least one free portion of the stick 5, and a raised position in which the further gripping arrangement 45 is at a distance from the support surface 44 of the fifth motorized conveyor 40 and maintains said portion of the stick 5 gripped. The further actuating device 46 is structurally similar to the actuating device 21 disclosed previously, so the description thereof will not be repeated. The removal direction D8 can be parallel to the direction of the force of gravity.

The fifth motorized conveyor 40 is provided with a further abutting element 41 that occupies a volume of space greater than the receiving surface 42. The further abutting element 41 is fixed and is arranged to cooperate with the further gripping arrangement 45 to extract easily one hook after the other of the seasoning hooks 3, 3*a*, 3*b*, . . . from the slices of seasoned bacon 2', 2*a'*, 2*b'*, as explained below.

The further abutting element 41 can have a fork structure similar to what is described for the abutting element 27, to the description of which reference is made.

It is assumed that, initially, the further gripping arrangement 45 is open and is in a raised position, and that slices of seasoned bacon have reached the pick-up zone of the support surface 44 of the fifth motorized conveyor 40.

In use, the further actuating device 46 moves the further gripping arrangement 45 along a removal direction D8 from the raised position to the lowered position.

In use, the further gripping arrangement 45 closes to grasp a free portion of the stick 5 of the hook positioned in one of the conveying elements 57, 57*a*, 57*b*, . . . .

In use, the further actuating device 46 moves the further gripping arrangement 45 along a removal direction D8 from the lowered position to the raised position. This upward movement of the further gripping arrangement 45 picks up the hooks from the respective conveying element, and simultaneously lifts up from the support surface 44 also the slices of seasoned bacon 2', 2*a'*, 2*b'*, or at least the end portions of the slices inserted into the hook.

In use, the further abutting element 41 abuts on the end portions of the slices of seasoned bacon 2', 2*a'*, 2*b'* and prevents the slices of seasoned bacon 2', 2*a'*, 2*b'* from being lifted further. This causes the hook to be extracted from the slices simply and the slices of fresh bacon 2, 2*a*, 2*b* return to rest on the support portion of the receiving surface 42. The further gripping arrangement 45 continues movement along the removal direction D8 to the raised position, maintaining the hook 3 with the axis X transverse to the direction of the force of gravity.

The control arrangement is configured also to control the operations of the further manipulator device 37 disclosed above, and all the operations performed by the further conveying arrangement to take the hooks and the seasoned bacon to the pick-up zone.

With reference to FIGS. 7, 9A, 9B and 9C, the unloading portion 1' includes a sixth conveyor 49, which is structurally similar to the second motor-driven conveyor 30, arranged to move each hook from the unloading zone 36 to the robot device 35 along a removal direction D9 transverse to the removal direction D8, or also parallel to and opposite the first unloading direction D6. The sixth conveyor 49 is operationally positioned above the fourth conveyor 54 and to the third conveyor 38.

The sixth conveyor 49 is positioned at a position that is vertical to the resting plane P so that an end portion thereof, for example a return pulley, substantially faces the further gripping arrangement 45 of the further manipulator device 37, when the latter is in a raised position.

In the raised position, the seasoning hooks 3, 3*a*, 3*b* are released onto the sixth conveyor 49, as explained below.

In the vicinity of the end portion, the sixth conveyor 49 is provided with a still further gripping arrangement 60 which is similar structurally to the gripping arrangement 22 and to the further gripping arrangement 45.

The still further gripping arrangement 60 can include at least one gripper (in particular a pair of grippers), drivable to close to grasp at least one free end portion of the stick 5 of the hook (for example the hook 3 shown in FIGS. 9A, 9B and 9C), and open to free the end portion. The at least one gripper is rotatable around an axis of rotation that is not illustrated, and can rotate in the direction of rotation V in the other direction of rotation W, opposite the direction of rotation V.

The still further gripping arrangement 60 includes an actuating arrangement connected to the at least one gripper to move the gripper along a direction parallel to the removal direction D9 approaching or moving away from the further manipulator device 37. The actuating arrangement can also be configured to rotate the gripper around a rotation axis thereof in the direction of rotation V, or in the opposite rotation axis W.

In use, the still further gripping arrangement 60 interacts with the further gripping arrangement 45 when the latter is in a raised position to pick up the hook and release the hook on the sixth conveyor 49.

In use, the still further gripping arrangement 60 is brought near the further gripping arrangement 45 in raised position, or whilst the further gripping arrangement 45 is about to arrive in raised position. In use, the further gripping arrangement 45 opens to free the hook and the still further gripping arrangement 60 closes to grasp the hook. In use, the still further gripping arrangement 60 is moved away from the further gripping arrangement 45 and the gripper of the further gripping arrangement 60 is rotated to take the grasped hook from a position in which the axis X of the hook is transverse to the direction of gravity to another position in which the axis X is parallel to this direction (FIGS. 9B and 9C). In use, the further gripping arrangement opens again to release the hook onto a seat (of the links) of the sixth conveyor 49.

The further gripping arrangement 45 can again be taken to a lowered position to start a new unloading and extracting cycle.

Figure 6:
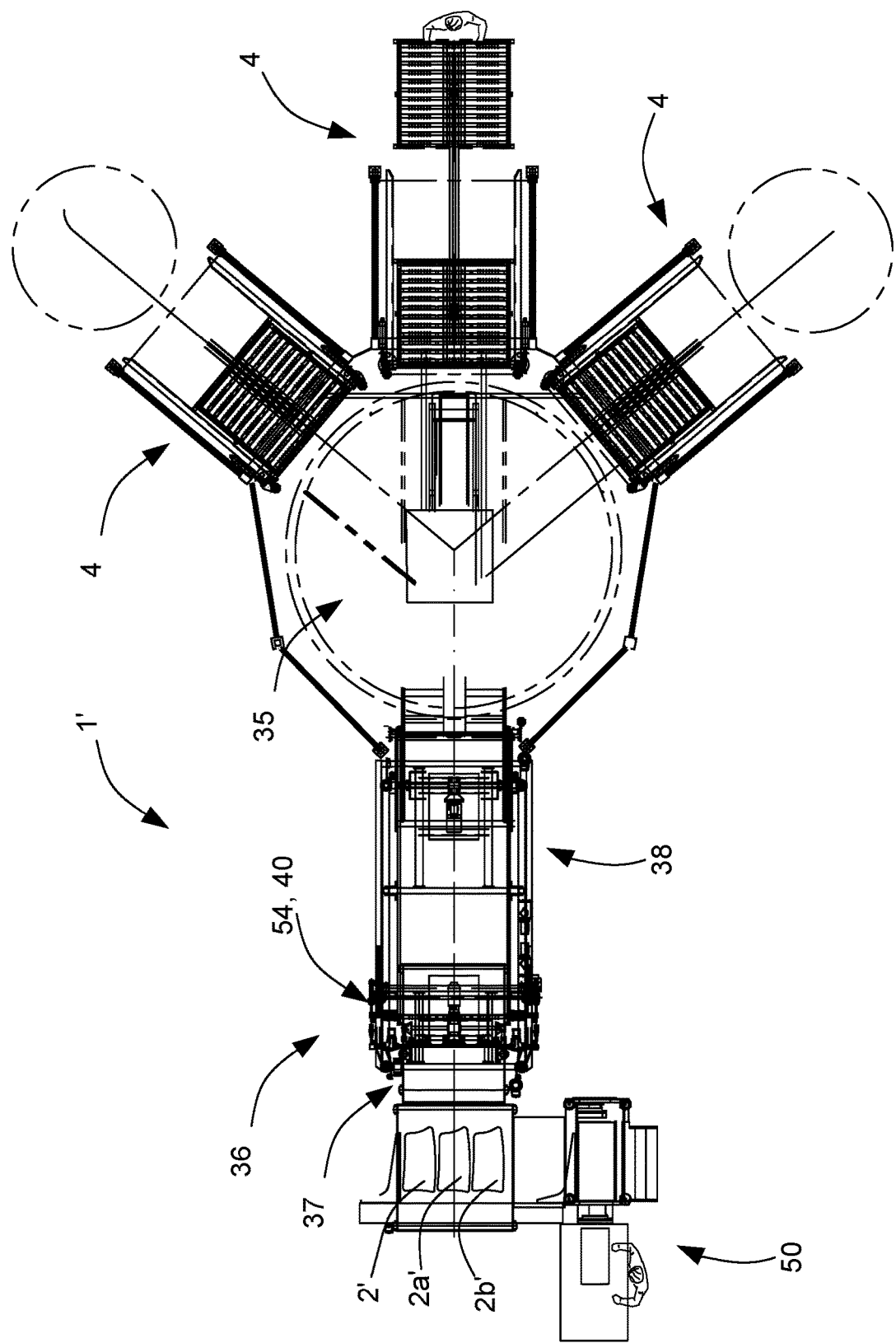
FIG. 6 is a top view of an unloading portion of the apparatus according to the invention configured to unload automatically slices of seasoned bacon from seasoning hooks.

The slices of seasoned bacon 2', 2*a'*, 2*b'* devoid of the hooks are moved to an exit zone 50 of the apparatus, as shown in FIGS. 6 and 7.

All the conveying, or transporting, operations, in addition to the operations of loading and unloading fresh or seasoned bacon onto or from the seasoning hooks, can be coordinated and controlled by a control device, for example a computer connected (in a known manner) to the motor-driven conveyors and to the manipulator devices of the two parts of the disclosed apparatus.

Owing to the apparatus according to the invention provided with motor-driven conveyors, manipulator devices as disclosed previously (and owing to the control performed to coordinate and control the operations performed by the latter), an operator is not engaged in the manual activity of loading fresh bacon onto seasoning hooks and unloading seasoned bacon from the aforesaid seasoning hooks; this enabling a number of slices of bacon to be loaded onto or unloaded from the aforesaid seasoning hooks that is almost double, passing from about 400 slices of bacon an hour to about 800 slices of bacon an hour.

The invention claimed is:

1. Loading and unloading apparatus for loading and unloading bacon slices including a loading portion that is configured to load slices of fresh bacon onto seasoning hooks in a loading zone of said apparatus, each of said seasoning hooks being provided with a stick and with a main body that extends along an axis, said loading portion including:
- a motor-driven conveying arrangement arranged to convey said slices of fresh bacon along a conveying direction between an entrance zone of said apparatus and said loading zone;
- a first motor-driven conveyor arranged to convey said seasoning hooks to said loading zone along a transport direction; said first motor-driven conveyor being conformed to convey said seasoning hooks, maintaining the seasoning hooks spaced apart from one another and keeping said axis substantially parallel to a direction of the force of gravity;
- a second motor-driven conveyor arranged to receive said seasoning hooks loaded with said slices of fresh bacon, and to move away said seasoning hooks from said loading zone moving said slices of fresh bacon along a feeding direction, maintaining the seasoning hooks spaced apart from one another and keeping said axis substantially parallel to the direction of the force of gravity;
- a manipulator device configured to load onto said seasoning hooks said slices of fresh bacon;
- a control arrangement for controlling the speed of said manipulator device so that said manipulator device picks up one hook at a time in coordination with an arrival of said hook in an end portion of said first motor-driven conveyor, and releases said hook loaded with said slices of fresh bacon each time in coordination with an arrival of a seat of said second motor-driven conveyor in an end portion of said second motor-driven conveyor,
- wherein said conveying arrangement includes a conveyor belt connected to a motor which can be driven to convey said slices of fresh bacon along said conveying direction, and to interrupt a movement of said conveyor belt when the end portions of said slices of fresh bacon reach an end of said conveyor belt and protrude downwards;
- said conveyor belt is provided at said end with an abutting element which is rotatable to abut and lift upwards said end portions of said slices of fresh bacon;
- said manipulator device is provided with a gripping arrangement configured to pick up one hook after the other of said seasoning hooks from said first conveyor and to release one hook loaded with said slices of fresh bacon at a time onto said second conveyor, said manipulator device being further configured to move said picked hook along an inserting direction transverse to said conveying direction; and
- said gripping arrangement includes at least one gripper arranged to close so as to grip a portion of said stick and to open so as to free said portion of said stick, said at least one gripper being rotatable around its own axis of rotation.

2. Loading and unloading apparatus for loading and unloading bacon slices including a loading portion according to claim 1 and an unloading portion that is configured to unload slices of fresh bacon from seasoning hooks in an unloading zone of said apparatus, each of said seasoning hooks being provided with a stick and with a main body that extends along an axis, said unloading portion including:
- a motor-driven conveying arrangement, arranged to convey said seasoning hooks, loaded with said slices of seasoned bacon, between a seasoning zone and said unloading zone maintaining the seasoning hooks spaced apart from one another and rotating the seasoning hooks so that said axis is transverse to a direction of the force of gravity;
- a manipulator device provided with a gripping arrangement cooperating with said conveying arrangement to unload/extract one hook after another of said seasoning hooks from said slices of seasoned bacon and to move away said hook from said conveying arrangement;
- a control arrangement for controlling the speed of said manipulator device so that said manipulator device extracts said hook from said slices of seasoned bacon in coordination with an arrival of said hook in an end portion of said conveying arrangement;
- wherein said conveying arrangement includes a conveyor extending along a first unloading direction and defining a closed-loop path, and a further conveyor, defining a closed-loop path that extends in a second unloading direction, transverse to said first unloading direction;
- said unloading portion further including a transfer device positioned between said conveyor and said further conveyor, said transfer device being configured to pick up one hook at a time from said conveyor and transfer the hook to said further conveyor.

3. Apparatus according to claim 1, wherein said first conveyor defines a closed-loop path, on said first conveyor a plurality of seats being provided located at a predetermined distance from one another along said closed-loop path, each seat of said plurality of seats being conformed to house said stick of each hook of said seasoning hooks and to move the stick parallel to said transport direction along a branch of said closed-loop path.

4. Apparatus according to claim 1, wherein said first conveyor is provided with a first slide configured to receive said stick in said end portion of said first conveyor, said first slide including a pilot portion sized to receive said stick, said first slide being rotatable between a raised configuration in which said pilot portion is substantially aligned with said branch of said closed-loop path, and a lowered configuration in which said pilot portion is substantially misaligned with said branch of said closed-loop path, said first slide receiving said stick in said raised configuration.

5. Apparatus according to claim 1, wherein said abutting element includes a plurality of prongs placed at a predetermined distance from one another so as to define a plurality of passage gaps.

6. Apparatus according to claim 1, wherein said manipulator device is provided with an actuating device connected to said gripping arrangement, being drivable along said inserting direction to move said gripping arrangement between a raised position in which said gripping arrangement is near said end portion of said first conveyor, and a lowered position in which said gripping arrangement is near said conveying arrangement.

7. Apparatus according to claim 6, wherein said gripping arrangement in said lowered position inserts said hook into said slices of fresh bacon whilst said abutting element is rotated to abut on and lift upwards said end portions of said slices of fresh bacon.

8. Apparatus according to claim 1, wherein said gripping arrangement further includes an actuating unit connected to said at least one gripper and drivable to rotate said at least one gripper in one direction of rotation or in another direction of rotation opposite said direction of rotation.

9. Apparatus according to claim 8, wherein when moving from said raised position to said lowered position, said actuating unit is driven to rotate said gripping arrangement in said direction of rotation so that said axis is oriented substantially transversely to said direction of the force of gravity, and further when moving from said lowered position to said raised position said actuating unit is driven to rotate said gripping arrangement in said other direction of rotation so that said axis is oriented substantially parallel to said direction of the force of gravity.

10. Apparatus according to claim 1, wherein said second conveyor defines a closed-loop path that extends along said feeding direction, on said second conveyor a plurality of seats being provided that are located at a distance from one another along said closed-loop path, each seat of said plurality of seats being conformed to house said stick of each hook of said seasoning hooks released from said gripping arrangement and to move said stick along a branch of said closed-loop path parallel to said feeding direction.

11. Apparatus according to claim 10, wherein said second conveyor in said end portion is provided with a second slide including a guide plane conformed to receive said hook loaded with said slices of fresh bacon from said gripping arrangement, said second slide being rotatable between a raised configuration in which said guide plane is substantially aligned with said branch of said closed-loop path, and a lowered configuration in which said guide plane is substantially misaligned with said branch of said closed-loop path, said second slide receiving said hook in said raised configuration.

12. Loading and unloading apparatus for loading and unloading bacon slices including an unloading portion that is configured to unload slices of fresh bacon from seasoning hooks in an unloading zone of said apparatus, each of said seasoning hooks being provided with a stick and with a main body that extends along an axis, said unloading portion including:
- a motor-driven conveying arrangement, arranged to convey said seasoning hooks, loaded with said slices of seasoned bacon, between a seasoning zone and said unloading zone maintaining the seasoning hooks spaced apart from one another and rotating the seasoning hooks so that said axis is transverse to a direction of the force of gravity;
- a manipulator device provided with a gripping arrangement cooperating with said conveying arrangement to unload/extract one hook after another of said seasoning hooks from said slices of seasoned bacon and to move away said hook from said conveying arrangement;
- a control arrangement for controlling the speed of said manipulator device so that said manipulator device extracts said hook from said slices of seasoned bacon in coordination with an arrival of said hook in an end portion of said conveying arrangement;
- wherein said conveying arrangement includes a conveyor extending along a first unloading direction and defining a closed-loop path, and a further conveyor, defining a closed-loop path that extends in a second unloading direction, transverse to said first unloading direction;
- said unloading portion further including a transfer device positioned between said conveyor and said further conveyor, said transfer device being configured to pick up one hook at a time from said conveyor and transfer the hook to said further conveyor.

13. Apparatus according to claim 12, wherein on said conveyor a plurality of seats is provided located at a predetermined distance one another along said closed-loop path, each seat of said plurality of seats being conformed to house said stick of each hook of said seasoning hooks loaded with said slices of seasoned bacon, and to move said stick along a branch of said closed-loop path parallel to said first unloading direction.

14. Apparatus according to claim 12, wherein said further conveyor is provided with conveying elements placed at a predetermined distance from one another along said closed-loop path, each of said conveying elements defining a seat for receiving and housing one hook at a time of said seasoning hooks from said conveyor, said conveying elements being movable along said second unloading direction to move said seasoning hooks maintaining the seasoning hooks spaced apart from one another.

15. Apparatus according to claim 14, wherein said transfer device includes a first linear actuator including in turn a rod and a cylinder, said rod being conformed to abut on a portion of said hook in said seat of said conveyor, said rod being movable with respect to said cylinder along an upward direction and a downward direction opposite said upward direction to disengage said portion of said hook from said seat in an exit portion of said conveyor and release said hook onto a conveying element of said conveying elements.

16. Apparatus according to claim 15, wherein said first linear actuator is rotatable around its own axis of rotation in said direction of rotation or in said other direction of rotation, said second transfer device further including a second linear actuator connected to said first linear actuator and which can be driven to rotate said first linear actuator around said rotation axis in said direction of rotation or in said other direction of rotation.

17. Apparatus according to claim 14, wherein said conveying arrangement includes a still further motor-driven conveyor defining a closed-loop path extending in a direction substantially parallel to said first unloading direction, said still further conveyor being provided with a receiving surface placed at least in part below said conveyor to be contacted by said slices of seasoned bacon loaded onto said seasoning hooks conveyed by said conveying elements, said receiving surface further cooperating with said conveying elements to rotate each hook of said seasoning hooks housed in said seat of each conveying element whilst said conveying elements move along said second unloading direction so that said axis is transverse to the direction of the force of gravity.

18. Apparatus according to claim 17, wherein said gripping arrangement is arranged to pick up a hook of said seasoning hooks each time near said receiving surface from each conveying element of said conveying elements, said gripping arrangement being connected to an actuating device drivable along a removal direction, transverse to said first unloading direction, to move said gripping arrangement between a lowered position in which it is located near said receiving surface and a raised position in which it is at a distance from said receiving surface.

19. Apparatus according to claim 12, wherein said further conveyor is provided with an abutting element conformed to abut on the end portions of said slices of seasoned bacon when said gripping arrangement extracts said hook from said slices of seasoned bacon so as to hinder a movement of said slices of seasoned bacon and to facilitate an extraction of said hook from said slices of seasoned bacon.

* * * * *